(12) United States Patent
Iida et al.

(10) Patent No.: US 6,643,470 B1
(45) Date of Patent: Nov. 4, 2003

(54) FM SIGNAL CONVERTER, FM SIGNAL OPTICAL TRANSMITTER AND FM SIGNAL OPTICAL RECEIVER

(75) Inventors: Masanori Iida, Katano (JP); Hisashi Adachi, Mino (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 593 days.

(21) Appl. No.: 09/671,197

(22) Filed: Sep. 28, 2000

(30) Foreign Application Priority Data

Oct. 1, 1999  (JP) .......................................... H11-281214

(51) Int. Cl.[7] .............................................. H04B 10/04
(52) U.S. Cl. ........................ 398/187; 398/201; 359/278
(58) Field of Search ................................ 398/187, 201, 398/140; 359/278

(56) References Cited

U.S. PATENT DOCUMENTS

| | | | |
|---|---|---|---|
| 5,347,529 A | * | 9/1994 | Noe .............................. 372/28 |
| 5,923,458 A | * | 7/1999 | Fuse et al. .................... 359/278 |
| 6,014,243 A | * | 1/2000 | Saeki ........................... 359/278 |
| 6,512,621 B1 | * | 1/2003 | Fuse et al. .................... 398/187 |
| 6,556,327 B1 | * | 4/2003 | Ohya et al. .................. 398/185 |

FOREIGN PATENT DOCUMENTS

JP         2700622        10/1997

* cited by examiner

Primary Examiner—Hung N. Ngo
(74) Attorney, Agent, or Firm—Smith, Gambrell & Russell, LLP

(57) ABSTRACT

An FM signal converter comprising:

an amplitude detecting unit for detecting amplitude variation of a plurality of signals that are multiplexed with subcarriers, as an amplitude variation signal;

a peak detection unit for determining from said amplitude variation signal whether a peak of the amplitude of said plurality of signals exceeds a threshold and for generating peak detection information that includes information about said peak of the amplitude;

a frequency signal source for providing signal with a predetermined frequency that differs from any of the frequencies of said subcarriers;

an amplitude phase control unit for adjusting amplitude and phase of the signal from the frequency signal source according to said peak detecting information and outputting the adjusted signal as a corrected signal;

signal combining means for combining said corrected signal and said plurality of signals multiplexed with subcarriers, with considering a time for generating the corrected signal; and an FM modulator for modulating said signal from the signal combining means into an FM signal.

14 Claims, 9 Drawing Sheets

Fig. 3 (a)

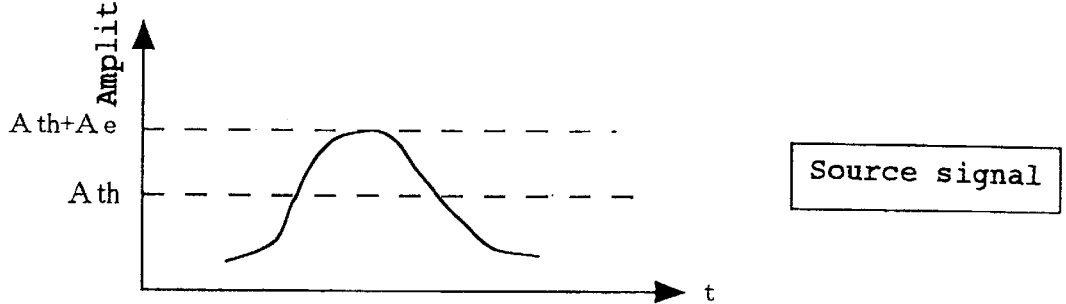

Source signal

Fig. 3 (b)

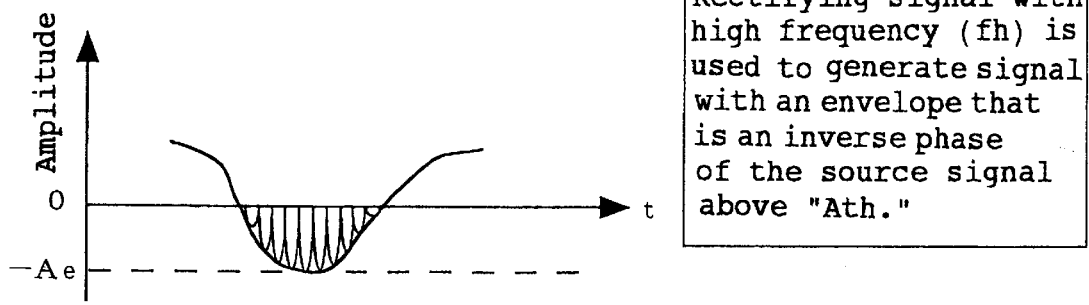

Rectifying signal with high frequency (fh) is used to generate signal with an envelope that is an inverse phase of the source signal above "Ath."

Fig. 3 (c)

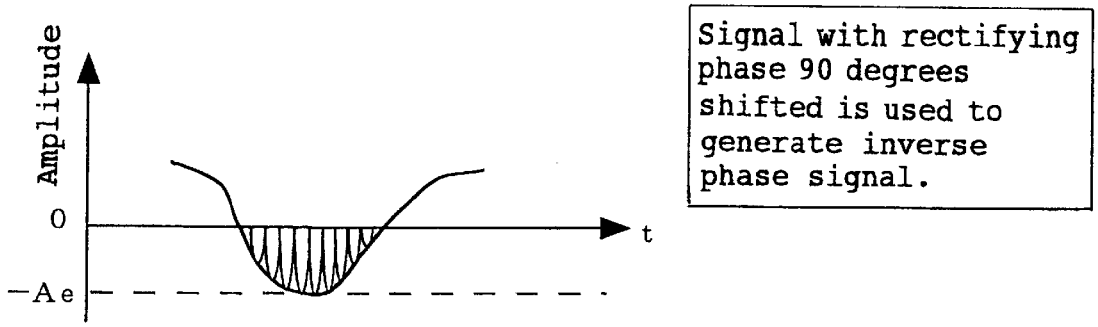

Signal with rectifying phase 90 degrees shifted is used to generate inverse phase signal.

Adding signal of (b) and (c) provides signal close to inverse phase. Such signal is added to the source signal to decrease amplitude level. Signal spectrum with fh is generated on the frequency axis (removable in LPF).

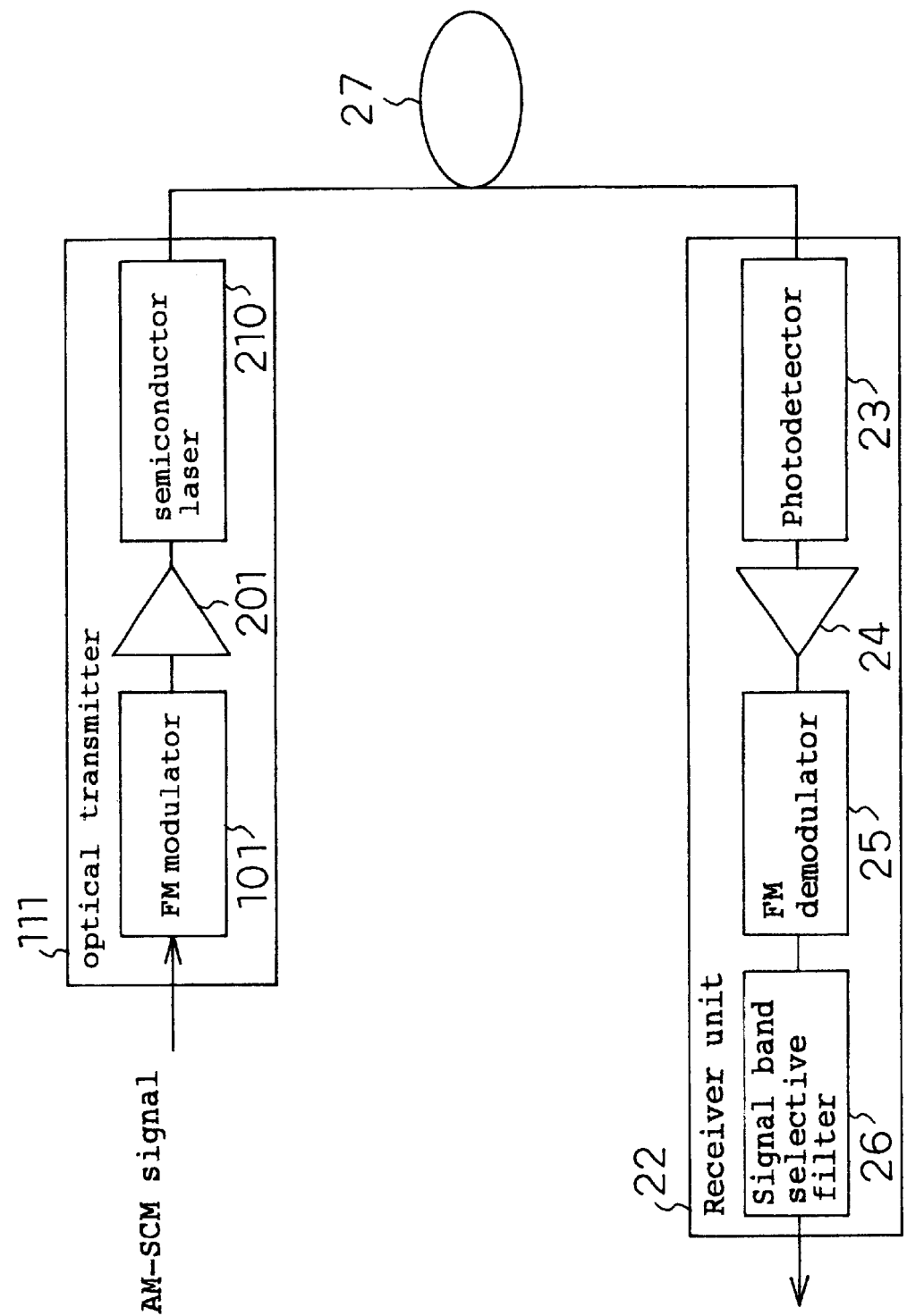

FM SIGNAL CONVERTER, FM SIGNAL OPTICAL TRANSMITTER AND FM SIGNAL OPTICAL RECEIVER

BACKGROUND OF THE INVENTION

1. Field of the Invention

This invention relates to FM signal converters and optical transmitting apparatus for use in telecommunications, CATVs, measurements, mobile communications and the like.

2. Releted art of the Invention

Recently, multi-channel optical transmission of video picture, voice or data that exploits low-loss broadband characteristics of optical fibers is made available in video monitoring systems, CATVs, subscriber lines and mobile communications. In such optical transmissions, multi-channel signal is electrically multiplexed by a plurality of sub-carriers with different frequencies into AM-SCM signal. The multiplexed signal is converted to optical signal by directly modulating e.g., semiconductor lasers to transmit via optical fiber.

Video optical transmission of AM signal is not costly because the modem configuration is simple. However, in order to achieve a C/N (carrier to noise ratio) associated with a desired video quality, high optical input power is required in the receiver side. Also, in mobile communication, since intensity level of transmitted voice and data signal vary substantially when a mobile terminal moves, high dynamic range against the signal variation is required. Further, distortion caused by reflected wave during optical conversion of semiconductor lasers and during optical fiber transmission may effect much, and an amplifier of AM signal requires good linear characteristics.

Following above needs, in order to improve anti-distortion and anti-noise of the optical transmission, an approach for optical transmission that converts subcarrier multiplexed AM signal together into FM signal is proposed. In order to get desired C/N value in optical transmission, modulation index is required to be large.

FIG. 9 shows a configuration of a prior art FM signal optical transmitting apparatus. FIG. 9 shows an optical transmitter 111, an FM modulator 101, a driver amplifier 201, a semiconductor laser 210, optical fiber 27, an optical receiving unit 22, a photodetector 23, a preamplifier 24, an FM demodulator 25 and a low-pass filter 26.

Operation of such a prior art FM signal optical transmitting apparatus with such a configuration is as follows. Multi-channel frequency multiplexed AM video signal (AM-SCM signal) is provided to an FM modulator 101 and broadband FM modulated signal is outputted.

As shown in FIG. 7(a), when the FM modulator directly modulates an FM laser (FM-LD) 81 via AM signal, not only amplitude of light is modulated but oscillating frequency of the light is also modulated. After this light is multiplexed by a multiplexer 83 with a local light source (LO-LD) 82 that has slightly different oscillating frequency, the light is provided to a photodiode 84 to be optical heterodyne detected, and broadband (for example, 1 to 6 GHz) FM modulated signal is obtained as the beat signal of two lasers. Using this FM modulated signal, a transmitting semiconductor laser 210 is directly modulated via a laser driving amplifier 201, and the signal is converted to optical signal to be transmitted via optical fibers 72. (For example, refer to Japanese Patent No. 2700622.)

Then, after the optical signal is amplified by e.g., optical amplifier, the signal is transmitted to a respective receiving unit via an optical branching unit. Illustratively, only one receiving unit 22 is shown. In the receiving unit 22, after the optical signal is converted to electrical signal by the photodetector 23 and is amplified by the preamplifier 24, the signal is demodulated into original AM-SCM signal in the FM demodulator 25 and a low pass filter. For example, the FM demodulator 25 is a delayed demodulating circuit and is composed of a high-speed logic IC (ex. AND gate) and a delaying unit, and a limiter amplifier.

As described, in prior art FM signal optical transmitting apparatus, in order to achieve the desired carrier-to-noise ratio (CNR) by FM modulation and demodulation, multi-channel AM-SCM signal with large amplitude variation is provided to an FM modulator since large frequency deviation is required. Multi-channel signal like this multi-channel AM-SCM signal generates large amplitude variation instantaneously if there are no correlation between each of the signals.

Therefore, in modulating operation of the FM modulator 101, an instantaneous amplitude variation of a voltage or a current of the AM-SCM signal directly becomes same with the frequency deviation.

However, in FM modulators in general, oscillating frequency deviation does not have linear characteristic against input amplitudes. As shown in FIG. 8, regarding curve 71 that denotes oscillating frequency deviation against amplitude variation, suppose the instantaneous amplitude variation 61 had a large peek value at time "tp" instantaneously, it may exceed a range ("A0+Ath" in FIG. 8) that the relationship between the amplitude variation and the oscillating frequency signal deviation remains linear, and may be FM modulated in non-linear area.

If these FM modulated signal is demodulated, modulated components in the above non-linear area may appear as a distortion in the demodulated signal, and aggravate the co-modulation distortion of the AM-SCM signal.

SUMMARY OF THE INVENTION

An object of the present invention is to provide a low cost FM signal optical transmitter that has a simple configuration, a low distortion and a good receiver sensitivity and that can transmit multi-channel AM-SCM signal, and an FM signal converter for enabling the above mentioned FM signal optical transmitter, and a low cost FM signal optical receiver.

An FM signal converter of the present invention comprises:

an amplitude detecting unit for detecting amplitude variation of a plurality of signals that are multiplexed with subcarriers, as an amplitude variation signal;

a peak detection unit for determining from said amplitude variation signal whether a peak of the amplitude of said plurality of signals exceeds a threshold and for generating peak detection information that includes information about said peak of the amplitude;

a frequency signal source for providing signal with a predetermined frequency that differs from any of the frequencies of said subcarriers;

an amplitude phase control unit for adjusting amplitude and phase of the signal from the frequency signal source according to said peak detecting information and outputting the adjusted signal as a corrected signal;

signal combining means for combining said corrected signal and said plurality of signals multiplexed with subcarriers, with considering a time for generating the corrected signal; and an FM modulator form modulating said signal from the signal combining means into an FM signal.

The FM signal converter according to said present invention is also such that the plurality of signals multiplexed with subcarriers can be obtained by suppressing a component of a carrier having said predetermined frequency out of a signal demodulated from said FM signal.

The FM signal converter according to said present invention is also such that said amplitude phase control unit adjusts amplitude and phase of the signal from the frequency signal source in such manner that amplitude level of voltage or current of said corrected signal is smaller than said predetermined threshold.

The FM signal converter according to said present invention is also such that said predetermined threshold is determined according to oscillating frequency deviation characteristics of said FM modulator.

The FM signal converter according to said present invention is also such that the signal outputted by said frequency signal source has at least one carrier frequency.

The FM signal converter-according to present invention is also such that the signals outputted by said frequency signal source are such signals that is converted from said plurality of signals multiplexed by subcarriers so that frequency band of converted signals do not overlap with those of said plurality of signals.

The FM signal converter according to said present invention is also such that said signals having at least one carrier frequency are a plurality of signals-with different phases.

The FM signal converter according to said present invention is also such that the signals outputted by the frequency signal source are signals converted from said plurality of signals multiplexed by subcarriers so that phase of converted signals do not overlap with those of said plurality of signals.

The FM signal converter according to said present invention can further comprise:

a signal switching unit for selectively outputting the signal outputted by the frequency signal source according to the magnitude of said peak of the amplitude.

The FM signal converter according to said present invention is also such that said signal switching unit selectively outputs a signal with optimum phase out of signals provided from said frequency signal source.

The FM signal converter according to any one of said present inventions is also such that a voltage-controlled oscillator is provided as said FM modulator.

The FM signal converter according to any one of said present inventions is also such that two semiconductor laser devices are provided as said FM modulator each which oscillates with single mode frequency and frequencies which are oscillated from said tow laser devices are proximate to each other, and further comprises:

an optical detector for O(optical)/E(electric) converting such multiplexed signal that is obtained, by directly modulating output signal from said signal combining means by one of said semiconductor laser device and multiplexing the modulated signal with signal from the other said semiconductor laser device, or by dividing output said signal from said signal combining means into two signals, and multiplexing such signal which is generated by directly modulating one of said divided signals by one of said semiconductor laser device, with such signal which is generated by phase-inverting the other dicided signal and further directly modulating the phase-inverted signal by the other semiconductor laser device.

An FM signal optical transmitter of the present invention comprises:

the FM signal converter according to any one of said present inventions; and an E/O converting unit for converting signal outputted from the FM signal converter into optical signal.

An FM signal optical receiver of the present invention comprises:

an O/E converting unit for converting optical signal transmitted from the FM signal optical transmitter according to claim 13 into electrical signal;

an FM demodulator for demodulating the FM signal converted into electrical signals; and a filter for outputting a plurality of signals multiplesed with subcarriers by suppressing a component of a carrier having said predetermined frequency out of the signal from the FM demodulator.

BRIEF DESCRIPTION OF THE DRAWINGS

FIG. 3(a) shows an example of the time variation of AM-SCM signal amplitude transmitted according to the present invention;

FIG. 3(b) shows a signal which is one of such signals that generate the corrected signal;

FIG. 3(c) shows a signal which is the other one of said such signals that generate the corrected signal;

FIG. 8 shows an FM modulation characteristics of an FM modulator according to the present invention; and.

FIG. 9 shows a configuration of a prior art FM signal optical transmitting apparatus.

Description of Symbols

Figure 1:
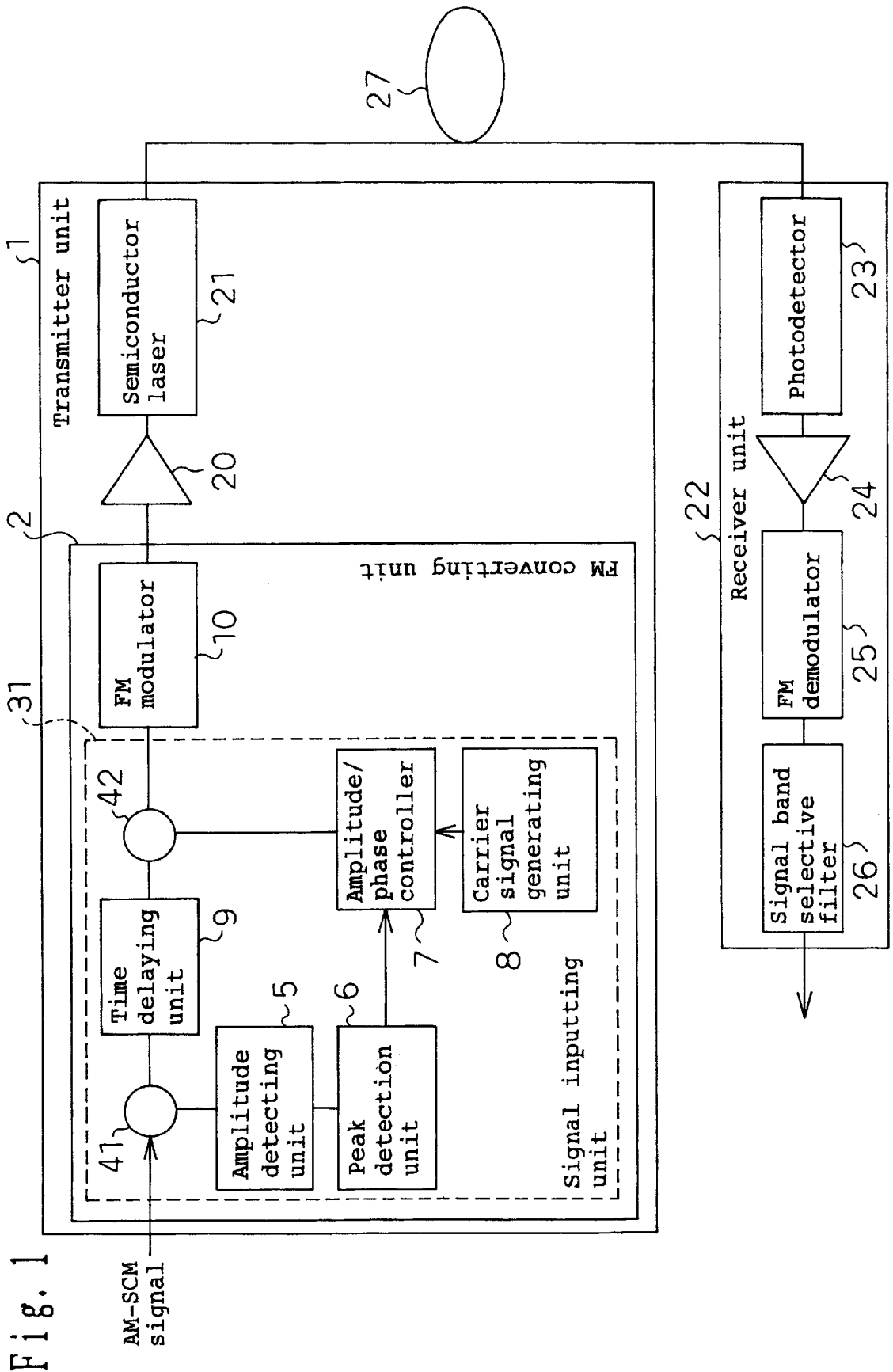
FIG. 1 shows a configuration of an FM signal optical transmitting apparatus according to a first embodiment of the present invention.

1 Transmitting unit
2 FM converting unit
31, 32, 33 Signal inputting unit
41 Signal branching unit
42 Signal combiner
5 Amplitude detecting unit
6 Peak detection unit 6
7 Amplitude/phase controller
8 Carrier signal generating unit
9 Time delaying unit
10 FM modulator
20 Broadband amplifier
21 Semiconductor laser
22 Receiving unit
23 Photodetector
24 Preamplifier
25 FM demodulator
26 Signal band selective filter
27 Optical fiber

DETAILED DESCRIPTION OF THE PREFERRED EMBODIMENTS

The embodiments of the present invention will be described with reference to the drawings.

First Embodiment

FIG. 1 is a configuration of an FM signal optical transmitting apparatus according to a first embodiment of the present invention. The optical transmitting apparatus comprises a transmitting unit 1 and a receiving unit 22.

The transmitting unit 1 comprises a signal inputting unit 31 that includes a signal branching unit 41, a time delaying unit 9, an amplitude detecting unit 5, a peak detection unit 6, a carrier signal generating unit 8, an amplitude/phase controller 7 and a signal combiner 42, and an FM converting unit 2 that includes the above mentioned signal inputting unit 31 and an FM modulator 10, a broadband amplifier 20 and a semiconductor laser 21. The receiving unit 22 comprises a photodetector (PD) 23, a preamplifier 24, an FM demodulator 25 and a signal band selective filter 26. Optical signal from the transmitting unit 1 is transmitted via optical fiber 27 and provided to the receiving unit 22.

The transmitting unit 1 corresponds to the FM signal optical transmitter according to the present invention, the FM converting unit 2 corresponds to the FM signal converter according to the present invention, the carrier signal generating unit 8 corresponds to the frequency signal source according to the present invention, the time delaying unit 9 and the signal combiner 42 corresponds to the signal combining means according to the present invention, and the receiving unit 22 corresponds to the FM signal optical receiver according to the present invention. This is also true with the following embodiments.

Figure 2:
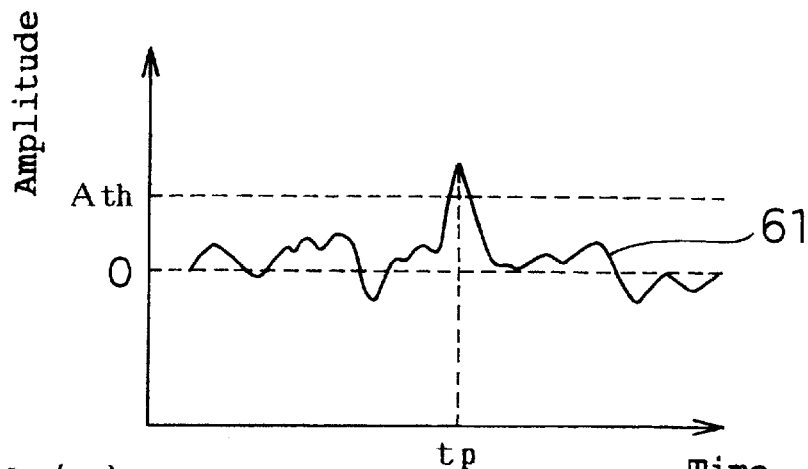
FIG. 2(a) shows an example of the time variation of AM-SCM signal amplitude transmitted according to the present invention.
FIG. 2(b) shows a time variation of a carrier signal amplitude.
FIG. 2(c) shows a time variation of a combined signal amplitude.
Figure 2:
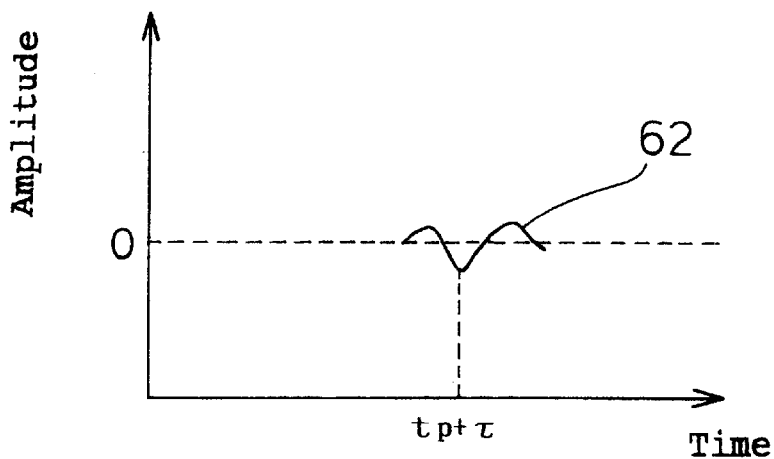
Figure 2:
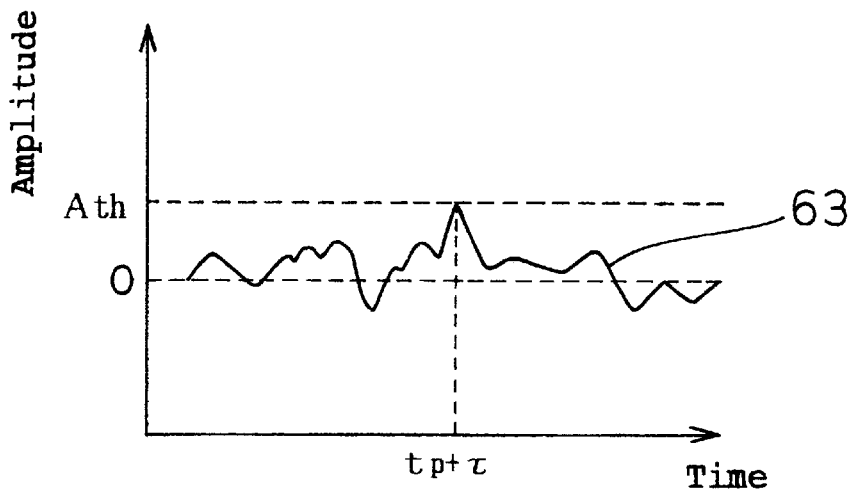

FIG. 2 shows a time variation of signal input to the FM modulator 10 for describing an operation of the optical transmission apparatus according to the present invention.

Figure 4:
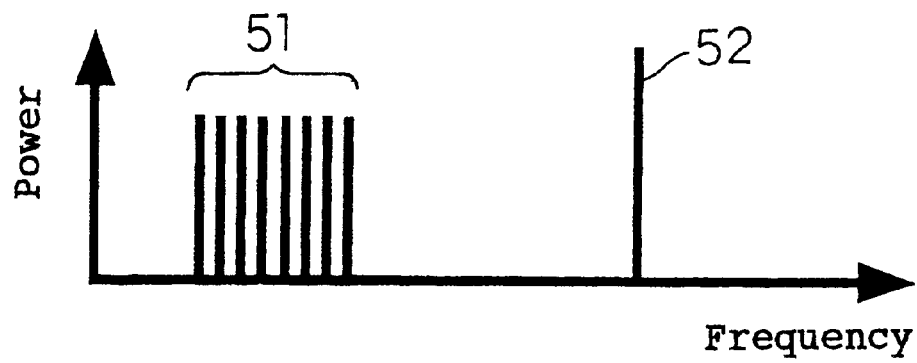
FIG. 4(a) shows a frequency location relationship between AM-SCM signal and carrier signal.
FIG. 4(b) shows a frequency location relationship between AM-SCM signal and frequency-shifted AM-SCM signal.
Figure 4:
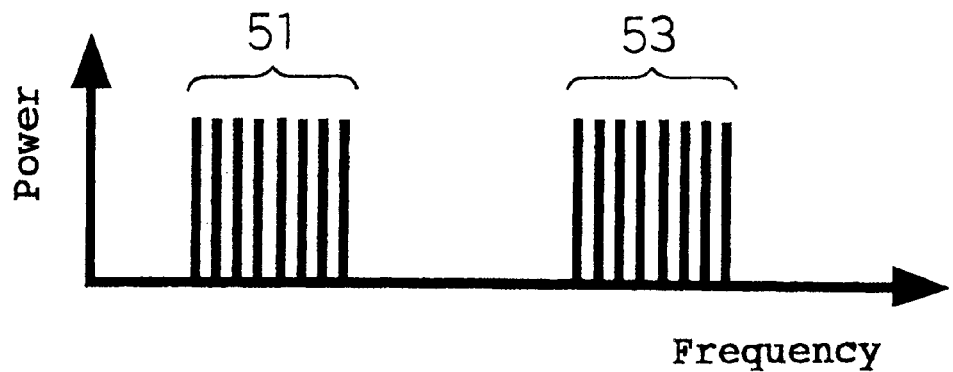

FIG. 4 shows spectrum charts of signal at the signal inputting unit 31. Numeral 51 denotes multi-channel AM-SCM signal spectrum, and 52 denotes carrier signal spectrum that is generated in the carrier signal generating unit 8 at frequency apart from the frequency band of the multi-channel AM-SCM signal (Illustratively, higher frequency.).

Figure 8:
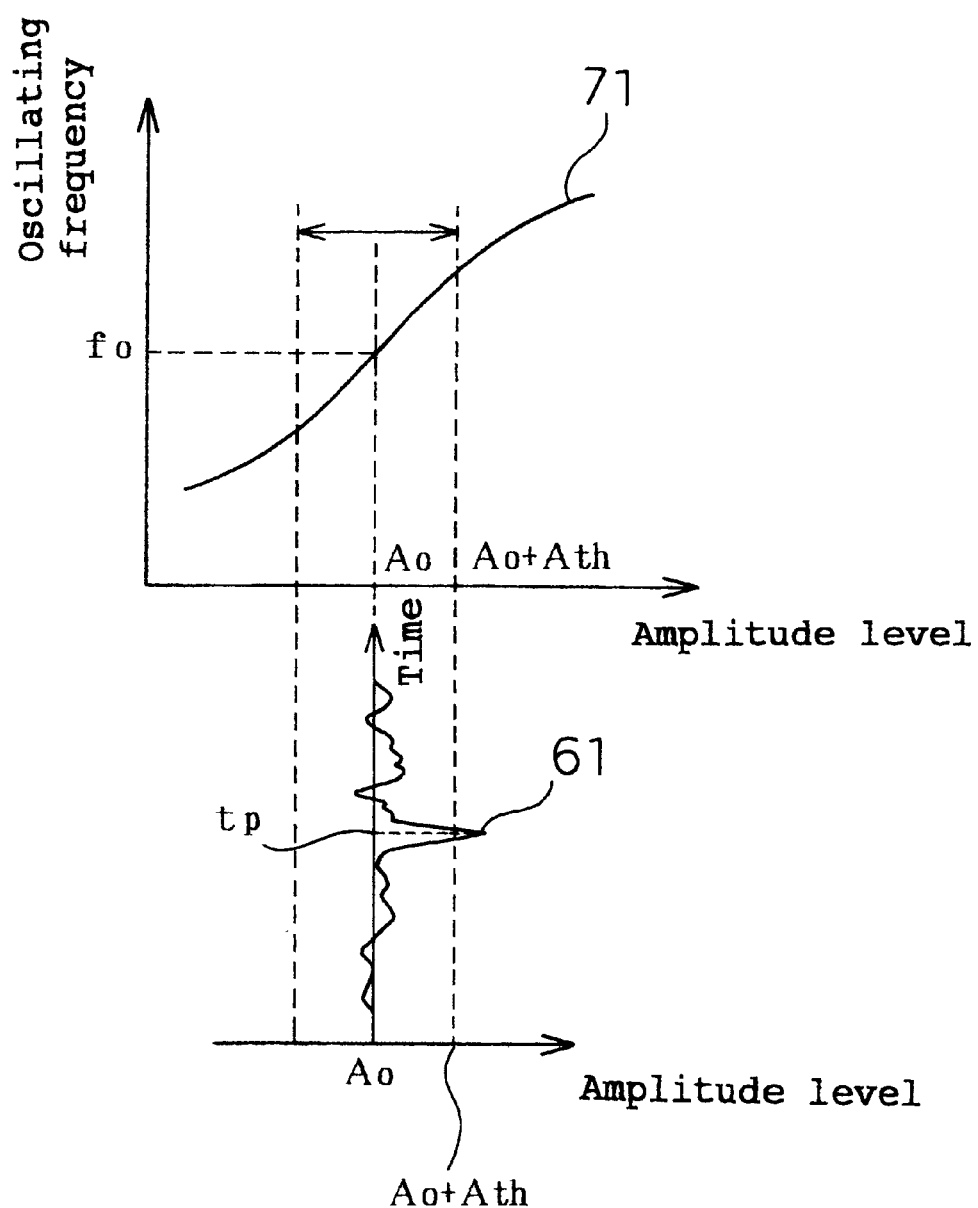

FIG. 8 shows an oscillating frequency deviation of the signal provided to the FM modulator 10 and the instantaneous amplitude variation. The modulation characteristic denotes linear change in oscillating frequency of the FM carrier wave in a range with a width twice an amplitude variation range "Ath" and with a center of an amplitude level "A0" (See curve 71.). The amplitude level "A0" corresponds to bias level that defines a carrier frequency f0 during the FM modulation.

Operation of the FM signal optical transmitting apparatus according to the first embodiment will be described.

Referring to FIG. 1, multi-channel AM-SCM signal is provided to the signal branching unit 41. Instantaneous amplitude variation of the signal component branched at the signal branching unit 41 is detected in the amplitude detecting unit 5. For example, circuit with envelope detecting function can be used as the amplitude detecting unit 5. The amplitude detecting unit 5 provides instantaneous amplitude variation signal like a curve 61 in FIG. 2(a).

The instantaneous amplitude variation signal is provided to the peak detection unit 6. In the peak detection unit 6, the instantaneous amplitude level is detected together with the peak detecting signal, at a time point ("tp") when the instantaneous variation of the amplitude level of the multi-channel AM-SCM signal exceeds the range from "A0" to threshold "Ath" in FIG. 2, i.e., outside of an amplitude variation range that exhibits linear modulation characteristic.

In the peak detection unit 6, a comparator is used for peak level detection in analog processing. In digital processing, the instantaneous amplitude variation value is quantized by an A/D converter, a significant bit in the binary representation is made as a threshold level, and the peek level detection is done if more significant bit than the significant bit is used for the quantized data. Thus, the instantaneous amplitude level and the time point are detected simultaneously.

Carrier signal from the carrier signal generating unit 8 is shaped in the amplitude/phase controller 7 so that the instantaneous phase of the amplitude level of the carrier signal forms instantaneous variation curve 62 that is of opposite phase and equal value to the amplitude phase during peak detection of the multi-channel AM-SCM signal based on the instantaneous amplitude level from the peak detection unit 6 and its time information.

The scheme to make the instantaneous variation curve 62 that is opposite phase and that has an equal value will be described referring to FIG. 3.

That is for such part of the original signal that is over the threshold value (Ath) in the FIG. 3(a), high frequency (fh) is full-wave rectificated and further the rectificated signal is amplitude-modulated in such manner that the envelope shape of the modulated signal becomes similar to the wave shape of the above mentioned part over the threshold value though the pahses are contrary to each other(FIG. 3(b)).

Further for such part of the original signal that is over the threshold value (Ath) in the FIG. 3(a), high frequency (fh) whose phase is shift by 90 degree to said above menteioned high frequency signal is full-wave rectificated also and further the rectificated signal is amplitude-modulated in such manner that the envelope shape of the modulated signal becomes similar to the wave shape of the above mentioned part over the threshold value though the pahses are contrary to each other (FIG. 3(b))

Furthermore such obtained two amplitude-modulated signals are synthesized to each other and finally the synthesized singal is added to the original signal corresponding to said over part thereby to lower the level of the over part of the original sigal than the thereshold value.

Regarding the amplitude/phase controller 7, in the amplitude control, values such as gain of the amplifier or attenuation of the attenuator may be made variable, and the phase control may use variable phase generator or may use e.g., the difference of transmitting line length like the time delaying unit 9, and delay filters.

Multi-channel AM-SCM signal from the other side, i.e., from the signal branching unit 41, is delayed by time τ in the time delaying unit 9 and combined with the carrier signal from the amplitude/phase controller 7 in the signal combiner 42, wherein τ denotes the time needed in operation for defining the amplitude level and the phase relationship in the amplitude/phase controller 7.

As shown in FIG. 4(*a*), a spectrum of the combined signal will have a shape such that a multi-channel AM-SCM signal spectrum 51 and a carrier signal spectrum 52 is multiplexed in the frequency domain. The instantaneous amplitude variation after the combining will be like curve 63 and becomes lower than the peak level threshold, and be able to be in the range of the linear FM modulation characteristic in FIG. 8.

Such combined signal is provided to the FM modulator 10, and a broadband FM signal will be obtained. Then, this FM signal is converted to optical signal by a direct modulation that use the semiconductor laser 21 via the broadband amplifier 20, and then transmitted via optical fiber 27.

Operation of the receiving unit 22 side is described. The optical signal transmitted by the optical fiber 27 is provided to the receiving unit 22. The optical signal provided to the receiving unit 22 is converted to electrical signal in the photo detector 23 that includes a light receiving element that is a photodiode or an avalanche photodiode, and the preamplifier 24, and then provided to the FM demodulator 25. FIG. 4(*a*) shows a spectrum of the signal demodulated by the FM demodulator 25.

There are several configurations for the FM demodulator 25 but a delay line type or a pulse count type demodulator with broadband and good linearity characteristics is preferred. The delay line type demodulator comprises a branch element for branching input signal, a delay circuit for providing time delay to a branched output signal, and a mixer for mixing an output from the delay circuit and the other branched output signal from the branch element (not shown). Broadband balanced type mixer may be used as the mixer. If necessary, a limiter amplifier for adjusting levels may be connected before the branch element in the FM demodulator 25.

Signal from the FM demodulator 25 is obtained as the original multi-channel AM-SCM signal 51 by removing the carrier signal component 52 in the signal band selective filter 26.

Thus, according to this embodiment, multi-carrier signal (AM-SCM signal) can be modulated in a range where an FM modulation characteristic is linear so that low distortion FM modulated signal is obtained. Also, since it suppresses large instantaneous amplitude variation, the oscillating frequency variation range, i.e., maximum frequency deviation of the FM modulator can be kept small.

Therefore, substantial band for the FM modulated signal of the multi-channel AM-SCM signal out of the transmitting FM signal band can be kept narrow so that the broadband response characteristic of the optical transmitting system can be relaxed.

Since the carrier signal can be automatically removed in the signal band selective filter in the receiver side, additional circuit components are not needed in particular. This is a great advantage of this embodiment.

The FM demodulator 25 is not limited to the above-described configurations. Circuits with a frequency discriminating function such as a multiple tuned frequency discriminator, a Foster-Seeley discriminator and a ratio envelope detector may be used.

In FM signal converted in the transmitting unit 1, high frequency side (higher band) and low frequency side (lower band) appear symmetrical to the FM carrier wave. However, either the higher band or the lower band may be transmitted. If band of one side of the two sides is transmitted, a limiter amplifier is inserted before the FM demodulator 25 in the receiving unit 22 such that the original FM signal is reproduced.

Second Embodiment

Figure 5:
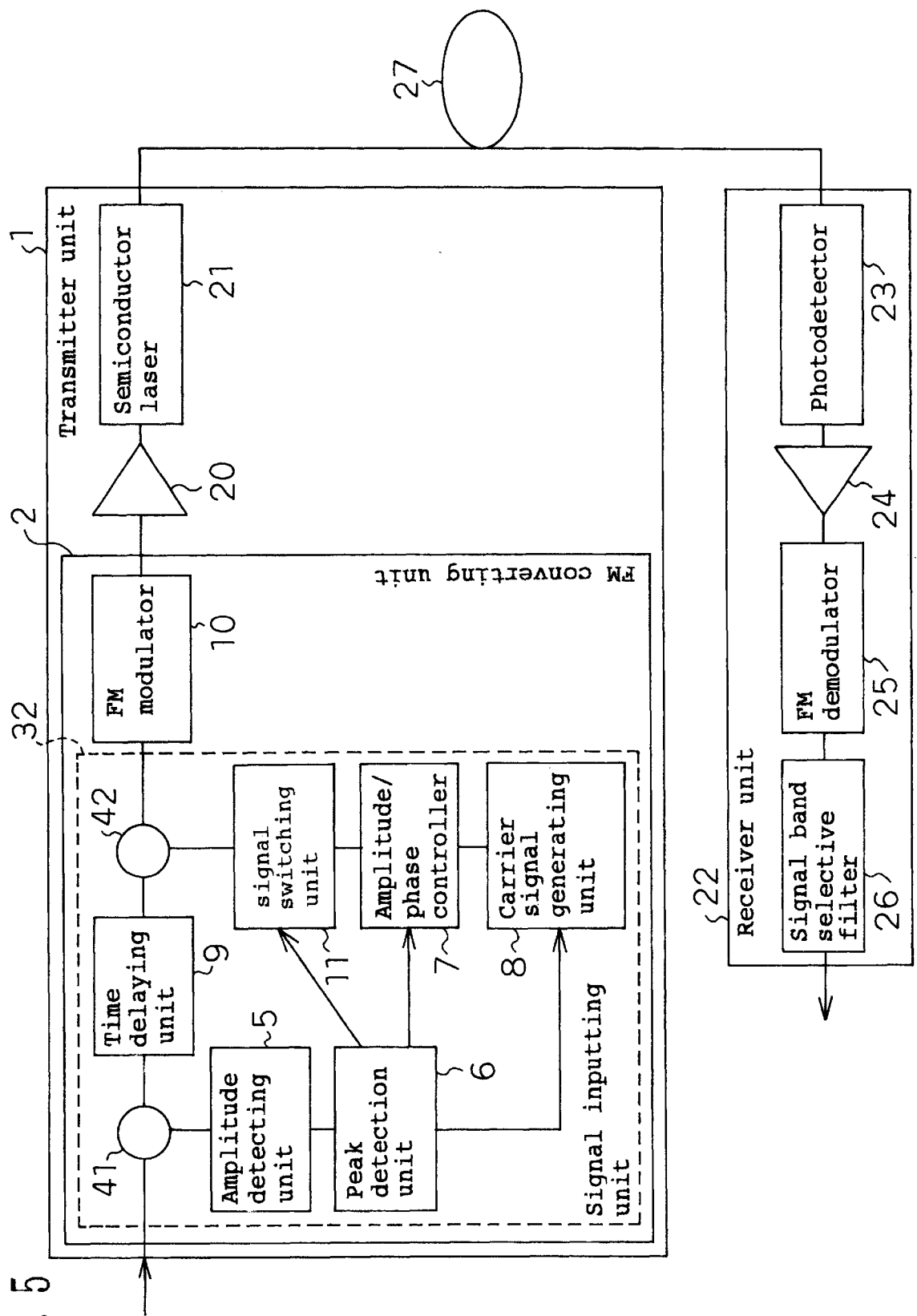
FIG. 5 shows a configuration of an FM signal optical transmitting apparatus according to a second embodiment of the present invention.

FIG. 5 shows a configuration of the transmitting unit 1 and the receiving unit 22 in the FM signal optical transmitting apparatus according to a second embodiment of the present invention. Comparing with the first embodiment shown in FIG. 1, this embodiment includes a signal inputting unit 32 that includes signal switching unit 11 that passes or blocks signal based on the peak detection signal from the peak detection unit 6 between the amplitude/phase controller 7 and the signal combiner 42. Same reference numerals denote same element with FIG. 1. The receiving unit 22 is same with the first embodiment so it will not be described.

The signal switching unit 11 can be implemented as an on-off circuit that uses transistors or FETs.

Regarding the signal switching unit 11, upon detecting peak that exceeds threshold by peak detection signal from the peak detection unit 6, the amplitude/phase controller 7 adjusts amplitude phase and outputs opposite phase signal to the signal combiner 42. If the peak is not detected, opposite phase signal will not be output to the signal combiner 42.

Thus, in this embodiment, in addition to the advantages of the first embodiment, carrier signal is provided and combined into AM-SCM signal if necessary, and therefore, bandwidth expansion after the FM modulation may not be stationary. Also, while the carrier signal is not provided, power may be saved if power supply to the carrier signal generator is stopped.

Third Embodiment

Figure 6:
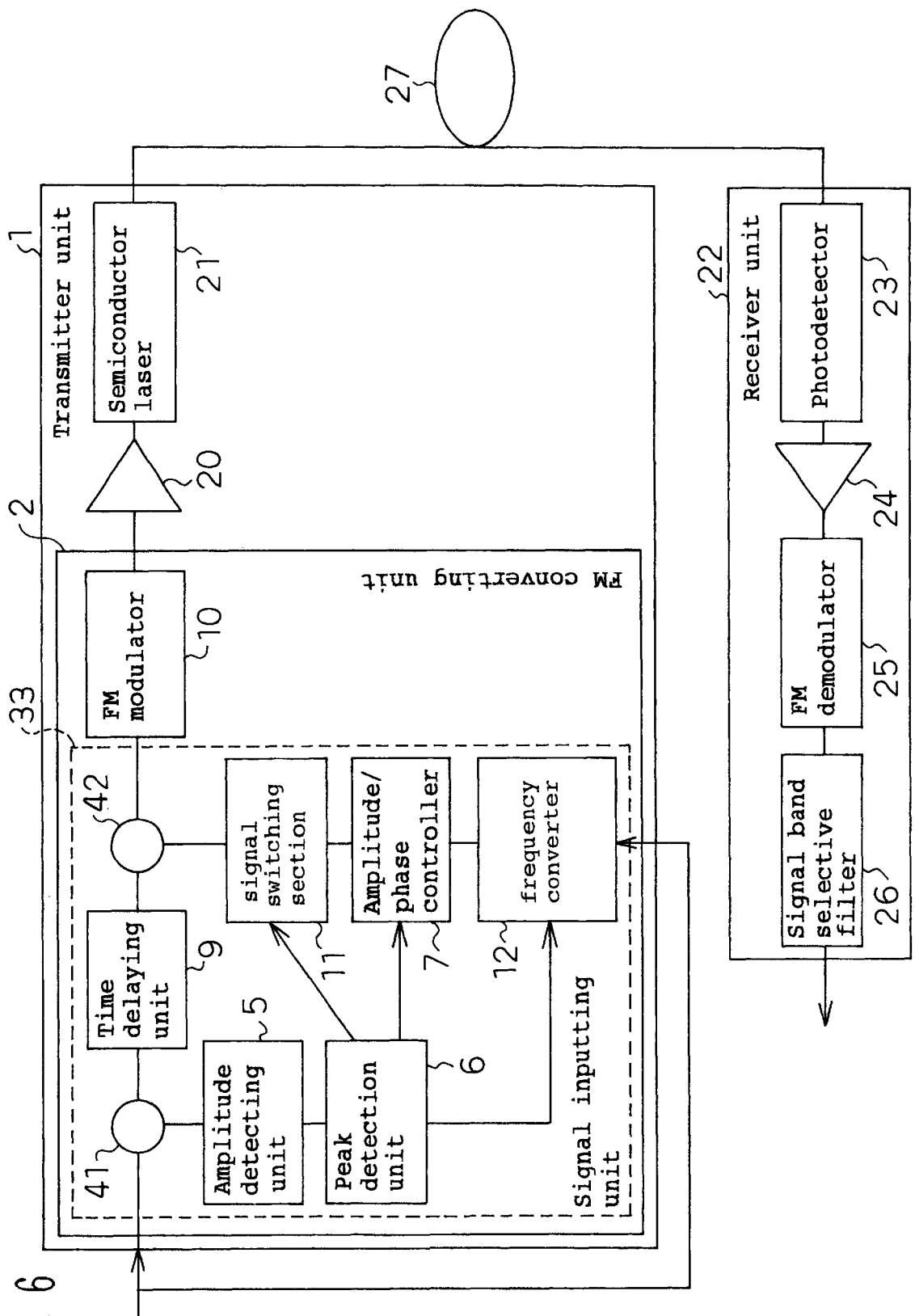
FIG. 6 shows a configuration of an FM signal optical transmitting apparatus according to a third embodiment of the present invention.

FIG. 6 shows a configuration of an FM signal optical transmitting apparatus according to a third embodiment of the present invention. Comparing with the first embodiment shown in FIG. 1, instead of the carrier signal generating unit 8, this embodiment includes a signal inputting unit 33 that includes a frequency converter 12 that provides the same signal as the multi-channel AM-SCM signal for providing to the signal branching unit 41, and as in the second embodiment shown in FIG. 5, this embodiment includes the signal switching unit 11 that passes or blocks signal based on peak detection signal from the peak detection unit 6 between the amplitude/phase controller 7 and the signal combiner 42.

The frequency converter 12 has a function to shift frequency band of the inputting multi-channel AM-SCM signal to higher frequency in this embodiment. For example, the frequency converter 12 comprises a successive multiplexer, or a local oscillator and a mixer.

Operation for this embodiment will be described except for the matter already described for the first embodiment.

In the multi-channel AM-SCM signal provided to the frequency converter 12, the frequency band is shifted to higher frequency relatively to the original frequency band, and in addition, the amplitude component and the phase component is adjusted in the amplitude/phase controller 7 to correspond with the peak detection signal from the peak detection unit 6, and combined with the original multi-channel AM-SCM signal in the signal combiner 42 synchronizing with the peak detected time by the signal switching section 11.

FIG. 4(b) shows a spectrum at this point of time. Spectrum 53 shows the multi-channel AM-SCM signal component that is shifted to higher frequency.

Thus, in this embodiment, in addition to the advantages of-the first embodiment, frequency shifted multi-channel AM-SCM signal is used as carrier signal for peak suppressing, and the instantaneous amplitude variation of the signal resembles the instantaneous amplitude variation of the original multi-channel AM-SCM signal so that the inner circuit configuration of the amplitude/phase controller 7 is made simple and synchronization during signal combining is made easier.

In this embodiment, a signal switching unit 11 is used but it is not required. Spectrum signal like the one shown in FIG. 4(b) is provided to the FM modulator 10 steadily.

Instead of adjusting phase in the amplitude/phase controller 7, a plurality of frequency-converted multi-channel AM-SCM signal or carrier signal with different phases may be provided. Then, frequency converted multi-channel AM-SCM signal or carrier signal with optimum phase is selected based on the peak detection signal from the peak detection unit 6 to combine with the original multi-channel AM-SCM signal in the signal combiner 42 (not shown).

In this embodiment, the band of the carrier signal is located higher than the band of the multi-channel AM-SCM signal but it may be located in lower frequency. The band may only need to remove carrier signal in the receiver side.

Signal to be transmitted is not limited to AM signal. It may be a subcarrier-multiplexed (SCM) multi-value modulation signal such as digital signal or QAM.

Figure 7:
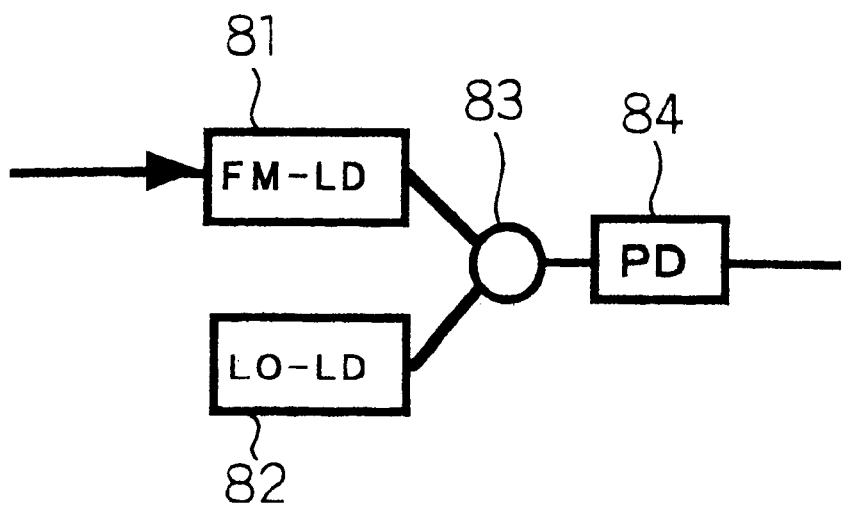
FIG. 7 shows an exemplary configuration of an FM modulator according to the present invention.
Figure 7:
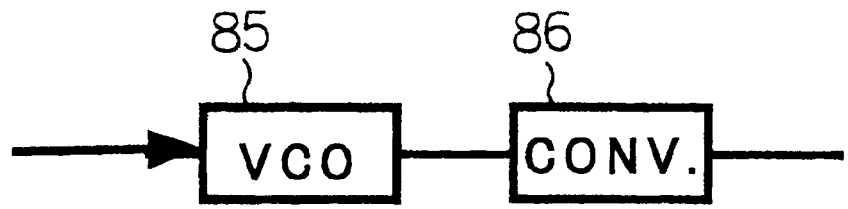

Particularly, the present invention is advantageous in the FM modulator using the voltage-controlled oscillator (VCO) 85 shown in FIG. 7(b). Generally, a voltage-controlled oscillator uses variable capacity diodes and parasitic capacities of elements as means for changing oscillating frequency. Therefore, capacity changes corresponding to the input amplitude variation will not be linear. Thus, expansion of the input amplitude variation range that is deemed linear in FM modulation by voltage-controlled oscillator will not be easy.

The present invention relates to an FM signal optical transmitter that converts multi-channel AM-SCM signal into FM signal and an FM signal optical transmitting apparatus that includes such an FM signal optical transmitter, wherein instantaneous amplitude of the multi-channel AM-SCM-signal is detected to detect peak level, in order to suppress the peak level, amplitude/phase of the carrier signal is controllably combined, and after converting into FM signal in the FM converter, it is converted to optical signal for transmission. The present invention is not limited to processing AM-SCM signal. For example, FM signal and PCM signal may also be processed.

Generally, an FM modulator converts AM signal to FM signal, and voltage-controlled oscillator (VCO) or phase modulator may be used for the FM modulator. The FM modulator may not convert directly to FM signal. It may combine indirectly from AM signal or phase modulated signal. An oscillator that use varacters or reactance transistors, or a digital oscillator with multi-vibrator may be used for the voltage-controlled oscillator. Also, after integrating the AM signal to produce phase modulated signal, balanced modulator may be used to produce narrowband FM signal.

Exemplary FM modulator may be configured to optical heterodyne combine FM-LD 81 that were directly modulated by the multi-channel AM-SCM signal and LO-LD 82 by the multiplexer 83 and to optical-to-electrical (O/E) convert in PD 84 to produce FM signal (shown in FIG. 7(a)), or may be configured to FM modulate the multi-channel AM-SCM signal in VCO 85 and for example, to shift to lower frequency by frequency converter 86 (CONV.).

Semiconductor laser may be used for the E/O (electrical-to-optical) converting unit. For example, in the present invention, long wavelength laser of InP-series material with 1.2 to 1.6 $\mu$m band wavelength,semi conductor laser with 0.98 $\mu$m band wavelength, or laser of GaAsAl-series material with oscillating wavelength of 0.78 $\mu$m band may be used.

Further, in the present invention, ordinary optical fibers may be used. For example, ordinary optical fibers having core diameter of about 10 to 300 $\mu$m may be used. Also, multi-mode optical fibers or single-mode optical fibers can be used.

The frequency converter uses frequency mixing effect of non-linear circuit elements to convert to higher or lower frequency, and has local oscillating signal generating function.

The present invention has advantages of generating low distortion FM signal that is able to transmit via optical fiber, and having stability and reliability with low cost.

What is claimed is:

1. An FM signal converter comprising:
   an amplitude detecting unit for detecting amplitude variation of a plurality of signals that are multiplexed with subcarriers, as an amplitude-variation signal;
   a peak detection unit for determining from said amplitude variation signal whether a peak of the amplitude of said plurality of signals exceeds a threshold and for generating peak detection information that includes information about said peak of the amplitude;
   a frequency signal source for providing signal with a predetermined frequency that differs from any of the frequencies of said subcarriers;
   an amplitude phase control unit for adjusting amplitude and phase of the signal from the frequency signal source according to said peak detecting information and outputting the adjusted signal as a corrected signal;
   signal combining means for combining said corrected signal and said plurality of signals multiplexed with subcarriers, with considering a time for generating the corrected signal; and
   an FM modulator for modulating said signal from the signal combining means into an FM signal.

2. The FM signal converter according to claim 1, wherein can be obtained by suppressing a component of a carrier having said predetermined frequency out of a signal demodulated from said FM signal.

3. The FM signal converter according to claim 1 or 2, wherein
   said amplitude phase control unit adjusts amplitude and phase of the signal from the frequency signal source in such manner that amplitude level of voltage or current of said corrected signal is smaller than said predetermined threshold.

4. The FM signal converter according to claim 3, wherein
said predetermined threshold is determined according to oscillating frequency deviation characteristics of said FM modulator.

5. The FM signal converter according to claim 4, wherein
the signal outputted by said frequency signal source has at least one carrier frequency.

6. The FM signal converter according to claim 4, wherein
the signals outputted by said frequency signal source are such signals that is converted from said plurality of signals multiplexed by subcarriers so that frequency band of converted signals do not overlap with those of said plurality of signals.

7. The FM signal converter according to claim 5, wherein
said signals having at least one carrier frequency are a plurality of signals with different phases.

8. The FM signal converter according to claim 4, wherein
the signals outputted by the frequency signal source are signals converted from said plurality of signals multiplexed by subcarriers so that phase of converted signals do not overlap with those of said plurality of signals.

9. The FM signal converter according to claim 4 further comprising:
a signal switching unit for selectively outputting the signal outputted by the frequency signal source according to the magnitude of said peak of the amplitude.

10. The FM signal converter according to claim 9, wherein
said signal switching unit selectively outputs a signal with optimum phase out of signals provided from said frequency signal source.

11. The FM signal converter according to claim 4 wherein
a voltage-controlled oscillator is provided as said FM modulator.

12. The FM signal converter according to claim 4 wherein
two semiconductor laser devices are provided as said FM modulator each which oscillates with single mode frequency and frequencies which are oscillated from said tow laser devices are proximate to each other, and further comprises:

an optical detector for O(optical)/E(electric) converting such multiplexed signal that is obtained, by directly modulating output signal from said signal combining means by one of said semiconductor laser device and multiplexing the modulated signal with signal from the other said semiconductor laser device, or by dividing output said signal from said signal combining means into two signals, and multiplexing such signal which is generated by directly modulating one of said divided signals by one of said semiconductor laser device, with such signal which is generated by phase-inverting the other dicided signal and further directly modulating the phase-inverted signal by the other semiconductor laser device.

13. An FM signal optical transmitter comprising:
the FM signal converter according to any one of claim 1 or 2; and
an E/O converting unit for converting signal outputted from the FM signal converter into optical signal.

14. An FM signal optical receiver comprising:
an O/E converting unit for converting optical signal transmitted from the FM signal optical transmitter according to claim 13 into electrical signal;
an FM demodulator for demodulating the FM signal converted into electrical signals; and
a filter for out putting a plurality of signals multiplesed with subcarriers by suppressing a component of a carrier having said predetermined frequency out of the signal from the FM demodulator.

* * * * *

UNITED STATES PATENT AND TRADEMARK OFFICE
CERTIFICATE OF CORRECTION

PATENT NO. : 6,643,470 B1 Page 1 of 1
DATED : January 14, 2004
INVENTOR(S) : Iishi et al.

It is certified that error appears in the above-identified patent and that said Letters Patent is hereby corrected as shown below:

Column 2,
Line 57, before the words "can be obtained" insert the phrase -- the plurality of signals multiplexed with subcarriers --.

Signed and Sealed this

Twentieth Day of April, 2004

JON W. DUDAS
*Acting Director of the United States Patent and Trademark Office*